United States Patent [19]
Wincklhofer et al.

[11] 3,762,976
[45] Oct. 2, 1973

[54] POLYBLEND GEMS AND THE LIKE AND METHODS FOR PRODUCING THEM

[75] Inventors: Robert C. Wincklhofer; Gene C. Weedon, both of Richmond, Va.

[73] Assignee: Allied Chemical Corporation, New York, N.Y.

[22] Filed: Feb. 19, 1971

[21] Appl. No.: 117,141

Related U.S. Application Data

[62] Division of Ser. No. 725,767, May 1, 1968, Pat. No. 3,581,522.

[52] U.S. Cl............... 156/173, 156/175, 156/180, 156/250, 156/296, 156/306
[51] Int. Cl....................... B32b 31/02, B32b 31/18
[58] Field of Search................. 156/154, 161, 166, 156/167, 173, 174, 175, 180, 181, 296, 306, 250; 161/3.5, 170, 176, 175; 350/293, 320, 288, 96 B

[56] References Cited
UNITED STATES PATENTS

| | | | |
|---|---|---|---|
| 3,639,195 | 2/1972 | Sanders | 156/306 |
| 3,369,057 | 2/1968 | Twilley | 260/857 |
| 3,148,102 | 9/1964 | Eakins et al. | 156/161 |
| 3,544,406 | 12/1970 | McAllister | 156/174 |
| 3,623,928 | 11/1971 | Wincklhofer | 156/175 |

*Primary Examiner*—Daniel J. Fritsch
*Attorney*—Luther A. Marsh

[57] ABSTRACT

The disclosure shows, among other things, a cabachon-cut chatoyant gem made from fused and aligned polyblend filaments.

2 Claims, 5 Drawing Figures

POLYBLEND GEMS AND THE LIKE AND METHODS FOR PRODUCING THEM

This is a division of application Ser. No. 725,767, filed May 1, 1968, now U.S. Pat. No. 3,581,522.

BACKGROUND OF THE INVENTION

1. Field of the Invention

The present invention relates to a gem and other similar objects and to the methods of making them from polyblend fibers made from at least two different polymers having different indices of refraction and different melting temperatures, with the higher melting temperature material present as small fibrils dispersed in a matrix of the lower melting point polymer. In order to make the gems and other ornamental objects, the filaments are fused together in a mass and formed to the desired shape. After polishing, the resulting article has a silky sheen if the fibers are fused together in a random fashion, a chatoyant sheen if the fibers are fused together in an aligned fashion, and shaped similar to a cabachon and exhibit asterism if the fibers are aligned parallel to the side of a hexagon or other polygon prior to fusion.

2. Description of the Prior Art

Heretofore, gems and similar ornamental objects have been made by taking thin, sheet-like pieces of urea-formaldehyde broken into small pieces and mixing them with granules of a synthetic resin such as methyl methacrylate, for example, and molding this mixture under sufficient heating pressure to plasticize the synthetic resin without plasticizing the pieces of solids. Also, prior to this invention, gems and similar ornamental objects have been made from clear polymers having suspended therein birefringent material. Patents showing this prior art as well as other examples are Conner U.S. Pat. No. 2,353,995 and Boone U.S. Pat. No. 2,663,171.

SUMMARY OF THE INVENTION

In accordance with the present invention, a unique new article having ornamental value, especially in the preparation of gems, and the method for producing such an article has been made. The starting material for making the article is a polymer filament of the type shown in Twilley U.S. Pat. No. 3,369,057 issued on Feb. 13, 1968. The teachings in this patent are incorporated herein by reference and show a filament made from two different polymers, one of which forms a matrix having a lower melting point than fibrils of a different polymer distributed throughout the filament and having the principal axis of the fibrils oriented primarily parallel to the axis of the filament. The fibrils, which may be a polyester as shown in the Twilley patent, also have a different index of refraction than the nylon matrix shown in the Twilley patent.

A large number of these filaments are oriented substantially parallel to one another either by winding on a mandrel or pulling through a die and using suitable heat and pressure to the extent necessary to cause the filaments to fuse to one another at the fusion point of the matrix without the orientation of the fibrils being destroyed. These fibrils, incidentally, have an order of magnitude approximating that of visible light. For example, the filaments of the Twilley patent have fibrils whose average diameter is usually not above one micron and preferably not above 0.5 microns, although the length on the average is at least five times and usually at least twenty times longer than the average diameter and typically average a length of 250 times the average diameter. This is to be contrasted with the wave lengths of visible light which extend from about 0.4 microns for the extreme violet to 0.72 microns for the deep red. By taking a section of these fused filaments and grinding and polishing them into a hemispherical shape, called a cabachon by lapidaries, with the filaments and fibrils oriented substantially parallel to the base, an article is formed which will pick up and reflect light in a manner to afford a single streak referred to as cats' eye or chatoyancy in certain natural gems which exhibit a similar phenomenon. While the exact scientific explanation for this phenomenon is not known, it is theorized, without being bound thereby, that the chatoyancy is due to the fibrils being oriented primarily in a single direction acting as transparent or translucent inclusions with a different index of refraction than the transparent matrix, with the diameter being of the order of magnitude of the wave length of light, whereas the length is substantially longer than the wave length of light. If we are not talking about quantum effects, there is no such thing as a "ray" of light. A ray simply represents the direction along which part of a wave front is advancing. An analysis of the behavior of light as an electromagnetic wave shows that the fundamental processes of refraction, reflection and scattering between two interfacing materials having different indices of refraction are not at all simple when one of the materials has a dimension of this order of magnitude and when adjacent fibrils may be spaced at comparable dimensions. Instead of bouncing off the interface between the two media, a wave train actually penetrates the second medium for a short distance before turning back into the original material. Light conduction lengthwise of the fibrils comes to resemble the transmission of microwaves by wave guides with most of the energy traveling down the fibril along the outside rather than inside the fibril in such a manner that a single streak of light perpendicular to the direction of the fibrils manifests itself in a cabachon-cut.

Also, ornamental surfaces can be prepared using this material in a non-oriented manner to display a silky sheen with numerous reflections. This is useful and moldable in itself as a new ornamental article even though it does not have the dramatic effect of the cats' eye.

If the filaments before being fused are laid in a manner that they are aparallel parallel the sides of a square, hexagon or octagonal prism, then asterism with four, six or eight points on the star will be manifested. Similarly, other polygonal shapes such as a pentagonal prism may be used to create a five-pointed star.

Also, the ornamental object produced can mereby be used as one component in producing a gem or other object which is made up of several layers utilizing other materials therewith. Also, the fineness and the depth of the cats' eye can be controlled by the quantity and alignment of the original fibrils or by dissolving out some of the fibrils after manufacture.

The jewelry and other objects produced using this material can take on many forms such as cuff links, tie pins, buttons, decorative ornaments, decorative coatings, and so forth.

Many objects and advantages of the present invention will become apparent from the following description taken in conjunction with the accompanying

DESCRIPTION OF THE INVENTION

Figure 1:
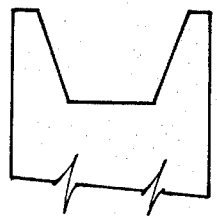
FIG. 1 is a partial sectional view of the mandrel upon which the filament is wound.
Figure 2:
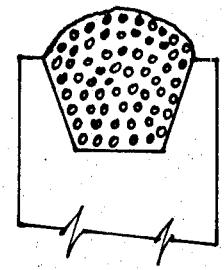
FIG. 2 is a view of FIG. 1 after the filament has been wound thereon.

As a first example of the practice of the invention, a filament composed of a polyblend of 70 percent nylon 6 and 30 percent of a polyester is extruded and drawn in accordance with the teachings of the Twilley patent with a drawn denier of 840. This filament is then twisted into a yarn to have a denier of 840 and is wound onto an aluminum mandrel in the form of a sheave 8 inches in diameter having a cross-section such as shown in FIG. 1. The depth of the groove is one-half inch, the width of the groove at the bottom is one-half inch and the width at the top is three-fourths inch. The yarn is wound onto the sheave by mounting the sheave onto the shaft of a variable speed motor and wrapping 3 to 4 yards of yarn about the central groove in order to tighten the yarn onto the sheave. The sheave is then rotated by adjusting the motor settings so that as the yarn is fed into the groove the yarn is slightly overlapped on each successive complete rotation of the sheave. The yarn is wrapped under suitable tension to prevent yarn slippage. When the sheave groove is completely filled with yarn, additional winding is confined to the center portion of the groove so that about three-sixteenths inch of wrapped yarn extends beyond the edge of the sheave as shown in FIG. 2. It is unnecessary to tie the end of the yarn to any support member since static electric charges built up during winding hold the cut end onto the wound bundle. The wound yarn is fused together at a temperature above the melting point of nylon 6 and below the melting point of the polyester which is polyethylene terephthalate. A temperature of 250°C. has been found to be suitable. The time required for fusion depends upon the size and construction of the sheave, its material of construction and the yarn denier. In the example just given, the fusion took place between 30 to 90 minutes exposure at 250°C. by heating in an oven. The fusion could also be effected by use of other heat sources such as infra-red lamps and the like. During heating the nylon matrix does not melt and flow as might be expected, but rather is fused into a cohesive mass. During this fusion process the alignment of the polyester particles is not substantially affected. The net result is a solid yarn bundle having fibrils widely dispersed therein which are aligned substantially parallel to one another around the annular yarn bundle. The wound sheave is removed from the oven and cooled to a room temperature by quenching the assembly in water. Tilting in an air stream could likewise be used, as well as other means of cooling. The fused yarn is then cut from the sheave by sawing across the yarn bundle.

Figure 3:
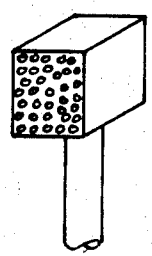
FIG. 3 is a perspective view of a cube cut from the wound filament of FIG. 2 and mounted on a dop.
Figure 4:
FIG. 4 is a side view of the material of FIG. 3 after it has been ground to a hemispherical shape.
Figure 5:
FIG. 5 is a plan view of FIG. 4 after the hemisphere has been polished to show the cats' eye.

A cube five-eighths inch on a side is then cut from this fused yarn and the side which corresponded to the top layer or outside surface of the yarn is roughened with sandpaper and glued to a ½ inch round wooden dop using a commercial glue manufactured by Borden Chemical Company known as Elmer's Glue. The assembly is then allowed to dry for 16 hours and, as shown in FIG. 3, the fibrils run parallel to the left bottom mounted on the dop. The edges of the cube are rounded by pressing the cube against a rotating sanding disc preparatory to mounting the dop in a metal lathe. After mounting in the lathe, the rounded cube is cut into a hemispherical shape. The rough-cut shape is subsequently polished by mounting the assembly in a rotary drill and rotating the assembly at 1700 r.p.m. The material is polished by successive sandings with 50, 100, 200, 300 and 400 grit sandpaper with final polishing being accomplished by crocus cloth to give the final shape as shown in FIG. 4. The polished assembly is then placed in boiling water for 30 minutes to facilitate the removal of the hemisphere from the dop as the Elmer's Glue is softened by the hot water. The finished piece is yellow-ivory in color and exhibits a bright flashing line perpendicular to the direction of the yarn windings as shown in FIG. 5. Gem cuts of this kind with rounded smooth surfaces are referred to as cabachons.

A second example may be carried out following the procedures set forth for Example 1, except utilizing a yarn made from 204 filaments twisted into a 1260 denier yarn. The resulting cabachon gem is identical to that produced by the first example except the cats' eye is slightly broader. This is believed to be due to the fact that the thicker denier made by the Twilley process produced fibrils slightly larger and gives rise to the observations that the finer the denier of the starting filament, the finer the line observed in the finished product.

A third example for practicing the invention is to produce a gem by the first example and then remove part of the polyethylene terephthalate from the fused yarn by exposure to a 5 percent solution of sodium hydroxide at 100°C. for 48 hours followed by water extraction in a jacketed soxhlet for 36 hours. This procedure removed 80 to 85 percent of the total amount of polyethylene terephthalate from the original yarn and produced a lustrous gem having a greater depth to the cats' eye.

A fourth example of carrying out the invention may be accomplished by using a yarn extruded and drawn from a 75 percent nylon 6 and 25 percent polyethylene mixture with the filament count being 14 twisted into a yarn of 210 denier and fused in an oven at 220°C. for 45 minutes. This would produce a cats' eye having a narrow line of light.

As a fifth example, the yarn of example 1 is chopped into short lengths and compressed between two matched dies made from aluminum to form the rough outline of the hemispherical cabachon as shown in FIG. 4. A compressed material is then heated at 250°C. for 45 minutes in an oven, after which it is removed and cooled by a water quench. The rough hemishpere is glued to the dop, then sanded and polished in the manner of example 1. The finished piece is yellow-ivory but does not exhibit the bright, flashing line characteristic of chatoyant or cats' eye gems. This is unquestionably due to the fact that the fibrils are not longer oriented in one principal direction but instead have a random orientation which gives rise to the silky or milky lustre of the gem.

As a sixth example, a gem is prepared by making a hexagonal prism from the fused yarn bundle prepared in accordance with the first example. Six triangular prisms five-eighths inch in height and one-half inch on each side of the triangle are cut from the bundle in such a manner that the fibrils run substantially parallel to one side of the prism, which shall be referred to as the base side, and intersect the other two sides at a substantial angle. The fibrils also run substantially parallel to the top and bottom of the prism. These six prisms are joined together in the form of a hexagonal prism ⅝ inch high by placing the six members together so that the base side to which the fibrils run substantially parallel forms the six outer sides of the prism. These six small triangular prisms are then autogenuously fused together by placing them under pressure sufficient to hold the sides together in the form of the hexagonal prism while raising the temperature to 250°C. for 90 minutes. The fused mass is then water quenched, mounted on a dop with the base of the prism being the surface glued to the dop and ground to the shape of a hemispherical cabachon in the same manner set forth in the first example. The resulting gem exhibited asterism by displaying several cross-streaks to produce a six-pointed star.

As a seventh example, a fused ring is prepared as in example 1, except that the groove in the aluminum mandrel is three-fourths inch deep in order to provide a greater depth to the fused ring. After the yarn is wound and fused but prior to being cut from the sheave, 12 equally flat sections are milled on the outer circumference with each of the sections being 2⅜ inch long. The fused ring is then cut from the sheave along a radial plane passing through the line where the flat faces intersect. Following this, the remainder of the ring is divided by cutting along a radial plane which intersects the line connecting the remaining flat sectors. The cylindrical inner portion is then ground flat in a plane paralleling the previously cut flat plane. From this blank are cut six triangular prisms one-half inch in height and five-eighths inch on each of the three sides with the aligned axis of the yarn running parallel to the base of the prism and parallel to one of the sides but intersecting the other two sides at a substantial angle. These six sections are glued together into a hexagonal prism using Eastman 910 Adhesive manufactured and sold by the Eastman Kodak Company of Rochester, N.Y. This adhesive is a methyl-2-cyanoacrylate. The hexagonal prism is formed from the triangle in a manner that the filaments run parallel to the base and to the sides. The assembly is then mounted onto a large wooden dop using Elmer's Glue and cut into the form of a hemispherical cabachon. Again, a six-pointed star with each point having a line running through the middle of the original triangular section is displayed.

As an eighth example, the process of the immediately preceding example is repeated except each triangular section is immersed in formic acid for 30 minutes. The formic acid penetrates the outer surface of the section, softening the nylon without disintegrating the fused yarn. The triangular sections are assembled as before using a circular clamp to hold them in position. The assembly is allowed to dry overnight. Final removal of the formic acid is accomplished by drying the clamped pieces 8 hours under vacuum at 80°C. The clamp is removed and the hexagon is secured to a wooden dop as previously described and a hemispherical cabachon is made therefrom. The resulting gem resembles the previously described gem except the lines formed between the cut edges are finer and less noticeable. An additional advantage of this technique is that the adhesive in this gem is dyed to exactly the same depth and shade as the original material.

As a ninth example, the process of example eight is repeated except the triangular prisms have two of their sides meeting at a 72° angle with the two remaining angles each being 54°. The side bounded by the 54° angles is the one to which the filaments are oriented in parallel planes. Five of these triangles are joined together to make a pentagonal prism with the resulting gem exhibiting a five-pointed star. Using the same technique, three-pointed, seven-pointed, and other odd-numbered points of stars can be formed, something never achieved in nature.

As a tenth example, example 1 is repeated except the fibers are bundled parallel to one another rather than wound about a mandrel and sufficient circumferential pressure is applied thereto to cause them to join together as a fused rod when heated to the melting point of the nylon. Gems cut from this material are similar to those of example 1, except due to difficulties in fiber alignment, the cats' eye is broader than in the case of the filaments having more perfect alignment as a result of being wound on the mandrel.

As an eleventh example, example 1 is repeated but using a mandrel that has a groove with one flat side and the other side forming a series of six ⅛-inch steps. Each step is in the form of a hexagonal prism ⅛ inch high with each step varying in the base dimension from the bottom portion which is mounted on a ¼-inch mandrel to the outer dimension which is approximately 2 inches along the greatest dimension of the hexagon. The yarn is then fused in an oven at 250°C. for 3 hours. The yarn used is the same as in example 1 except the filament count is 136 wound into a yarn of 840 denier. After fusing the cohesive mass is removed by the disassembly of the mandrel so as to provide a shell approximately ¼ inch thick whose outer surface is ground and polished and a small gem otherwise prepared placed in the ¼ inch mandrel hole. The resulting cabachon is almost 2 inches in diameter at its base and dramatically displays a six-pointed star.

As a twelfth example, example 1 is repeated except only one of the filaments in the yarn is a polyblend filament of nylon and polyester, the remaining filaments being pure nylon. The resulting gem displays a cats' eye having a greater depth than that of the first example.

The gems and other ornamental objects produced by the above examples can be formed in an infinite variety of colors by using the usual dyeing techniques for the various polymers either when they are in the yarn form prior to being used or else by dyeing or coating subsequent to the manufacture of the finished product. Also, numerous other polymer blends may be utilized provided they can be presented in the form of filaments having the fine fibrils dispersed in a transparent or translucent matrix which polymer fibrils have a higher melting point and a different index of refraction than the matrix polymer. The index of refraction should preferably be at least about one point difference in the second decimal and the difference in fusion temperatures should be sufficient to fuse the matrix materials of one filament to the matrix materials of another filament without requiring the fusion of the fibrils. In this connection, it is to be noted that the nylon used in the invention had an index of refraction of about 1.53, the polyester had an index of refraction of about 1.64 and the polyethylene had an index of refraction substantially less than that of the nylon. It was theorized above that the light-modifying properties of the article are believed to be due to the small diameter of the fibrils and their having a different index of refraction than the matrix; however, it may be additionally theorized that the interface between the filaments where they have been fused to one another may also give rise in varying degrees to the light-modifying properties provided by the articles made in the above examples.

The fibrils should be present in the matrix in substantial quantities with a diameter not greater than three times the wave length of visible light, that is less than about 2.5 microns and, preferably, a substantial quantity of the fibrils should have a diameter less than the wave length of visible light of 0.72 microns. These fibrils should be at least 5 microns long.

It is not necessary that the materials prepared in accordance with the examples herein be furnished merely in the form of hemispherical cabachons, as other cuts may be utilized or flat, round objects with holes for buttons or flat objects combined with other light-affecting members of infinite variety can be produced utilizing the principles of this invention which discloses methods and objects giving rise to new possibilities in light-modifying materials. Also, it will be apparent that still other modifications of the materials and products and methods above-described may be made in following the general principles exemplified herein. Therefore, such examples as have been presented are to be regarded as merely illustrative and the invention may be otherwise embodied and practiced without departing from the nature and spirit of the invention and it is to be understood that the invention is not limited to the details set forth herein except as set forth in the appended claims.

What is claimed is:

1. A method of making an aritificial gem in the shape of a cabachon that exhibits chatoyancy, comprised of light-transmitting matrix filaments fused together, said filaments being comprised of a polyamide matrix having polyester fibrils dispersed generally parallel in said matrix, which comprises: compressing a mass containing a quantity of polyblend fibers which have a matrix formed from polyamide polymer and fibrils of polyester polymer, said fibrils being largely of a diameter less than 2.5 microns and having a length greater than 5 microns, said polyblend fibers being drawn after extrusion to cause the fibrils to align themselves in the direction of the principal axis of the fiber, and the fibers being substantially aligned with one another prior to their being blended into a cohesive mass, said fibers being aligned and compressed by winding on a reel to form a mass of fibers, which is fused together at a temperature of about 250°C. for 30 to 90 minutes to cause said polyamide polymer matrix to blend into a cohesive union between adjacent fibers, cooling the mass to room temperature, and cutting and forming the mass into a cabachon with the fibrils running generally parallel to the base of the cabachon, whereby the cabachon exhibits chatoyancy.

2. The method of claim 1 wherein the polyester fibrils have a diameter less than 0.72 microns.

* * * * *